July 5, 1955  F. E. McCREERY  2,712,456

EXHAUST DUCT WITH DETACHABLE BELLOWS

Filed Feb. 28, 1952  2 Sheets-Sheet 1

FRANK E. McCREERY
INVENTOR.

BY S. Tierney Jr
ATTORNEY

July 5, 1955   F. E. McCREERY   2,712,456
EXHAUST DUCT WITH DETACHABLE BELLOWS
Filed Feb. 28, 1952   2 Sheets-Sheet 2

FRANK E. McCREERY
INVENTOR.

BY S. Tierney Jr.
ATTORNEY

Patented July 5, 1955

2,712,456

EXHAUST DUCT WITH DETACHABLE BELLOWS

Frank E. McCreery, Chula Vista, Calif., assignor to Rohr Aircraft Corporation, Chula Vista, Calif., a corporation of California Application February 28, 1952, Serial No. 274,027

2 Claims. (Cl. 285—90)

This invention relates to a flexible metallic exhaust duct for the use in the exhaust system of a flexibly mounted internal combustion airplane engine and particularly to one of the type using a flexible metallic bellows connection.

The control of leakage in the exhaust system of an airplane engine has become extremely important in view of the fact that the high velocity, high temperature exhaust gases of the modern airplane engine are frequently used to operate a gas turbine or other gas powered apparatus, hence the loss of any appreciable amount of these gases will impair the efficient operation of such apparatus.

Various combinations of ball and socket universal joints and telescopic slip joints have been devised to provide a flexible exhaust duct for use in the exhaust system of such airplane engines. In some cases the expedient of enclosing various parts of the duct in a sealed chamber formed by welding a bellows connection to the duct, has been used to reduce leakage to a minimum while retaining the necessary flexibility of the duct.

The flexible exhaust duct being subjected to the vibrational movements of the airplane engine is almost constantly moving and, in a duct using a flexible bellows connection, the bellows is subjected to a constant flexing from either the movement of the duct or from the pressure of the exhaust gases entrapped by it. This constant flexing tends to weaken and break down the material from which the bellows is made, causing it to leak and allow the escape of exhaust gases.

Since the flexible bellows is usually the part of the exhaust duct in which material failure first occurs, it is desirable that it may be readily removed for repair or replacement. In the flexible exhaust ducts now in use, the connections between the flexible bellows and the exhaust duct are made by welding the end convolutions of the bellows to a part of the exhaust duct, making it difficult to repair or replace the bellows and frequently necessitating the replacement of a major portion of the duct.

It is accordingly an object of my invention to provide a flexible metallic exhaust duct of light weight, compact and durable construction, having a flexible metallic bellows to reduce exhaust gas leakage to a minimum, to which the flexible bellows is detachably attached in a manner that allows easy removal thereof for repair or replacement.

The metals used in the manufacture of flexible metallic bellows are carefully compounded and heat treated to provide the maximum of flexibility and at the same time maintain a high degree of strength. When the bellows are welded to the exhaust duct, the heat required to weld the parts together changes the properties of the metal causing it to lose much of its flexibility and become hard and brittle in the area of the weld so that the service life of the bellows is substantially shortened. It is therefore a further object of my invention to provide a flexible exhaust duct to which a flexible metallic bellows is attached without subjecting the bellows to the undesirable effects of the welding heat.

The joint made by welding the end of a flexible metallic bellows to an exhaust duct is essentially rigid so that the vibration of the inlet conduit is communicated to the bellows to a substantial extent, which constant vibration and consequent flexing of the bellows tends to deteriorate the metal thereof and decrease its life. It is believed that when the ends of the bellows are secured by clamping, a certain amount of resiliency is incorporated in the joints which dampens out the vibrations to a substantial extent and prevents their full transmission to the bellows with consequent greatly diminished flexure of the bellows near the joints. Whatever the explanation may be, it is found that the useful life of the bellows is considerably increased when the joint is effected by clamps instead of by welding. Therefore a further object of my invention is to provide a flexible exhaust duct to which a flexible metallic bellows is attached by means of clamps.

A further object is to provide a flexible exhaust duct having the aforementioned characteristics in which the means for detachably attaching the flexible bellows will not impair the flexibility of the exhaust duct.

Other objects will become apparent as the description of the exhaust duct proceeds. For a better understanding of the invention, reference is made to the drawings in which similar numbers refer to similar parts throughout the several views and in which.

Figure 1:
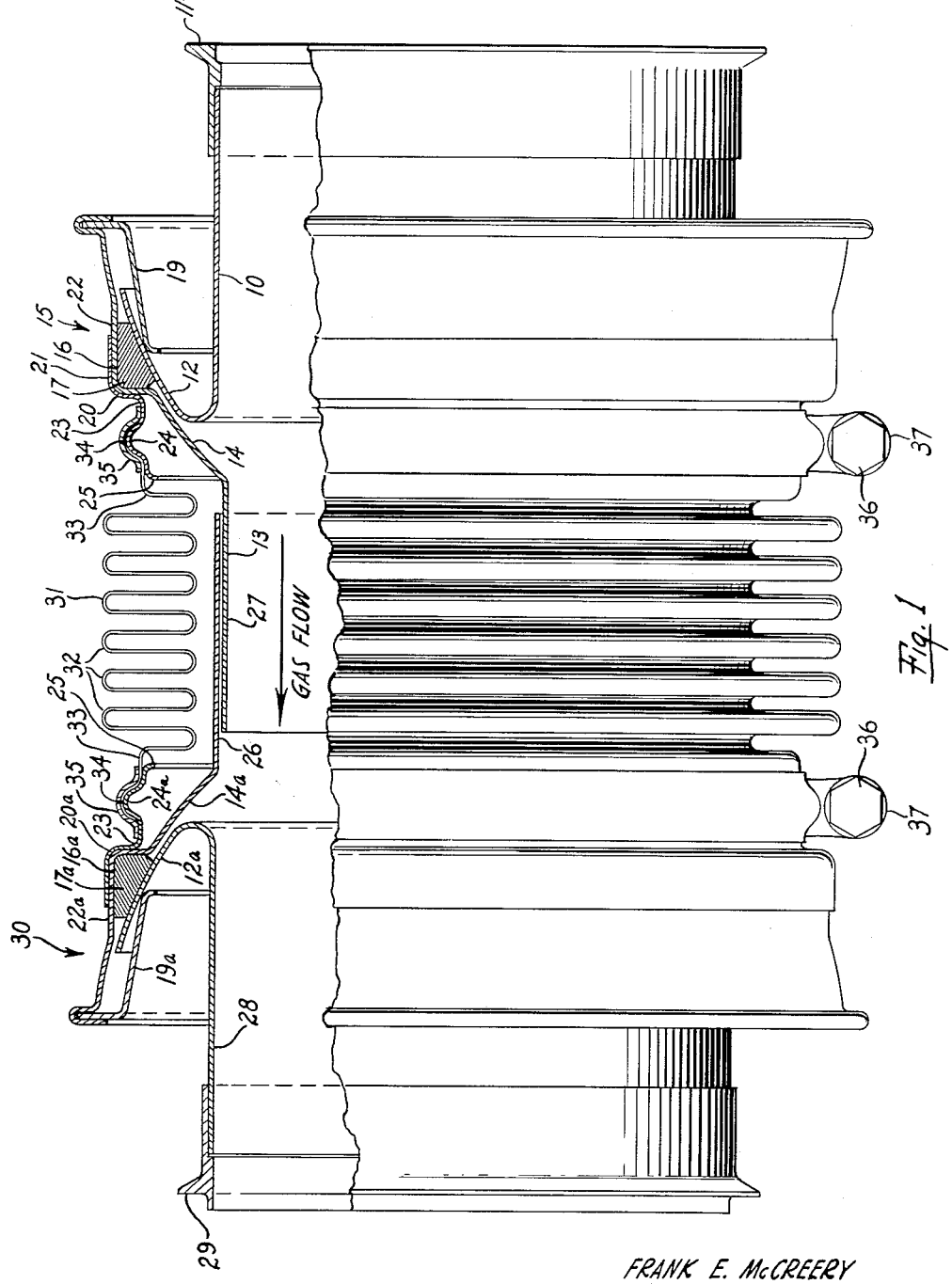
Figure 1 is a front view, partly in section, of a preferred construction of the flexible exhaust duct.
Figure 2:
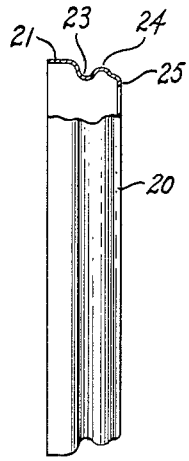
Figure 2 is a front view, partly in section of the clamp receiving ring on a reduced scale showing the annular bead.
Figure 3:
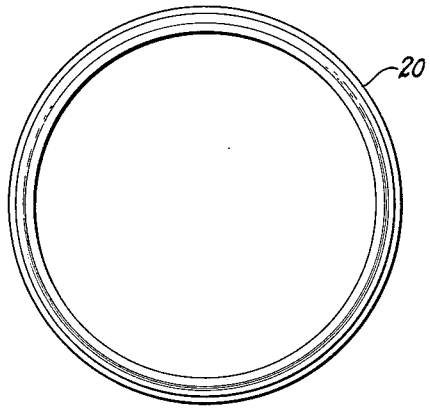
Figure 3 is an end view of the clamp receiving ring shown in Figure 2.
Figure 4:
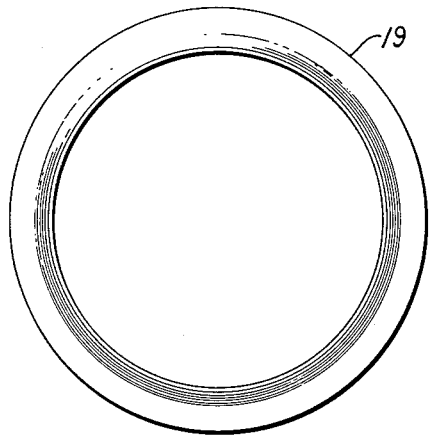
Figure 4 is an end view of the ball retaining ring on a reduced scale.
Figure 5:
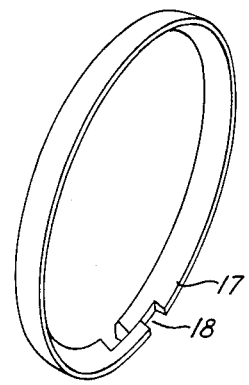
Figure 5 is a perspective view on a reduced scale of the anti-friction ring showing the step cut which splits it.
Figure 6:
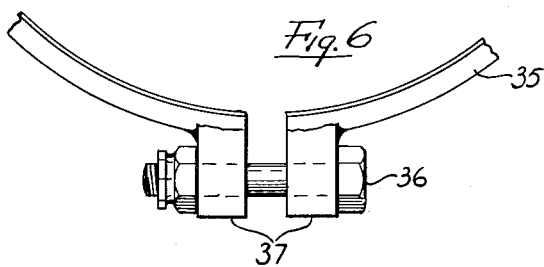
Figure 6 is an end view showing a portion of the clamp with a bolt in place.

The preferred form of my invention as illustrated consists of a first cylindrical conduit 10 having a machined flange 11 on its upstream and adapted to be connected to the exhaust outlet of an internal combustion airplane engine (not shown). The downstream end of conduit 10 is flared continually outward to form a spherically shaped ball member 12. A second cylindrical conduit 13 has an integrally formed socket 14 of generally spherical shape at its upstream end in engagement with ball member 12 thus forming a ball and socket universal joint 15 connecting conduits 10 and 13. An annular recess 16 in socket 14 is adapted to retain an anti-friction ring 17 the bearing surface of which is in frictional contact with ball member 12. Preferably, ring 17 is made of cast-iron containing a large amount of carbon and a nickel content of about 20 percent, such as the commercially made product Ni-Resist, which possesses high lubricating and corrosion-resistant qualities. Ring 17 is made slightly larger in diameter than the diameter of recess 16 and is split by a step cut 18, allowing it to be compressed sufficiently to be inserted in recess 16. The other component parts of the duct are preferably made of stainless steel to withstand the high temperatures of the order of 1500° F. to which such exhaust ducts are subjected in modern airplanes. A retaining ring 19 having one edge secured to the rim of socket 14 extends inwardly between ball member 12 and conduit 10 to press member 12 against the spherical face of ring 17 and assist in holding ball and socket members 12 and 14 in proper relative positions. For the purpose of attaching one end of the bellows, a clamp receiving ring 20 is provided, the upstream end of the ring being cylindrical, as indicated at 21, to fit over a cylindrical portion 22 of socket 14. Any suitable means such as welding may be used to secure ring 20 to the socket. Intermediate of its length ring 20 is bent inwardly at 23 and then outwardly and again inwardly to provide a convex clamp receiving bead 24, the downstream end of the ring being bent further in, as indicated at 25. A third cylindrical conduit 26 has its upstream end in telescopic sliding engagement with the downstream end of conduit 13 and forms a slip joint 27 therewith. A fourth cylindrical conduit 28 has its downstream end provided with a machined flange 29 which is connected by a mating flange (not shown) to a stationary exhaust discharge (not shown). The upstream end of conduit 28 is connected to the downstream end of conduit 26 by a ball and socket universal joint 30 which is similar in construction to ball and socket joint 15 and whose component parts are similarly numbered with the addition of the suffix $a$. An axially flexible metallic bellows 31 consisting of a series of rounded convolutions 32 has outwardly curved ends 33 which are shaped to conform to the contours of one half of beads 24 and 24$a$ and extend to the centers of these beads as indicated at 34. A pair of detachable clamping rings 35 are bent to conform to and snugly embrace the annular beads 24 and 24$a$ and the ends 33 of the bellows thus attaching the bellows 31 to the clamp receiving rings 20 and 20$a$ thereby forming a sealed chamber around slip joint 27. The clamps 35 are tightened by a pair of bolts 36 which pass through their ends 37. The sealed chamber thus formed by bellows 31 will entrap any of the exhaust gases which might escape through slip joint 27 and prevent them from doing any harm in the engine compartment. Also any exhaust gases present in bellows 31 will, by the pressure thereof, axially expand the bellows thereby exerting an axial force against socket members 14 and 14$a$. This forces rings 17 and 17$a$ into firmer contact with ball members 12 and 12$a$ thus substantially increasing the sealing properties of the ball and socket joints 15 and 30. Bellows 31 being positioned between the converging surfaces of socket members 14 and 14$a$, does not interfere with ball members 12 and 12$a$ but allows them free rotational and angular movement. Also since bellows 31 is axially flexible, it does not interfere with the proper operation of slip joint 27. The bellows construction described leaves the ball members 12 and 12$a$ and the major portions of socket members 14 and 14$a$ exposed to a current of coolant air passing along the assembly thus permitting the free radiation and convection of heat and preventing the temperature of the parts from rising unduly. The construction also permits a worn bellows to be easily removed and replaced by a new one.

In addition to the advantages of the detachable bellows as above set forth, it has been found that a bellows so attached to a flexible exhaust duct will outlast similar bellows which have been welded to the exhaust duct, by a considerable length of time. Failure of the bellows in such welded assemblies occurs most frequently in the end convolutions near the area of the weld and is due to the change in the properties of the material due to the heat required to weld the parts together and to the extremely rigid connection attained by welding. By clamping the ends of the bellows increased flexibility is provided without subjecting the metal to the welding heat, thereby appreciably increasing the life of the bellows.

This invention may be embodied in other forms or carried out in other ways without departing from the spirit or essential characteristics thereof. The present embodiment of the invention is therefore to be considered illustrative and not restrictive, the scope of the invention being indicated by the appended claims, and all changes which come within the meaning and range of equivalency of the claims are intended to be embraced therein.

Having thus described my invention, what I claim as new and desire to secure by Letters Patent is:

1. A flexible metallic duct capable of conveying the hot exhaust gas of an internal combustion engine comprising, in combination: a sheet metal cylindrical conduit having its downstream end flared outwardly to form a spherical ball segment; a second sheet metal cylindrical conduit having its upstream end flared outwardly to provide a spherical socket portion in engagement with said ball segment and also a cylindrical anchoring portion; a third sheet metal cylindrical conduit having its upstream end flared outwardly to form a second spherical ball segment; a fourth sheet metal cylindrical conduit in telescopic engagement with said second conduit and having its downstream end flared outwardly to provide a spherical socket portion in engagement with said second ball segment and also a second cylindrical anchoring portion; a pair of oppositely disposed bellows-supporting rings, each ring being composed of a single piece of sheet metal having a cylindrical portion secured to the periphery of one of said anchoring portions, and a convex bead portion having a diameter substantially less than the diameter of said cylindrical portion; a detachable, axially flexible metallic bellows having a plurality of convolutions, each end convolution having an integral extension capable of transmitting compression and having an annular concave terminal portion the diameter of which is substantially less than the diameter of said bellows and which is adapted to seat against said convex bead portion, the concave face of said terminal portion engaging substantially one-half of the convex face of said bead portion; and a pair of detachable metal clamps embracing the annular terminal portions of said bellows and securing the ends of said bellows to said bellows supporting rings, said bellows and supporting rings forming a sealed chamber to receive any exhaust gas leaking through the telescopic joint between said second and fourth conduits and the axial expansion of said bellows due to such leakage causing an increase in pressure of said socket portions against said ball segments.

2. A flexible metallic duct capable of conveying the hot exhaust gas of an internal combustion engine comprising, in combination: a sheet metal cylindrical conduit having its downstream end flared outwardly to form a spherical ball segment; a second sheet metal cylindrical conduit having its upstream end flared outwardly to provide a spherical socket portion in engagement with said ball segment and also a cylindrical anchoring portion projecting from the outer face of said socket portion intermediate its ends; a third sheet metal cylindrical conduit having its upstream end flared outwardly to form a second spherical ball segment; a fourth sheet metal cylindrical conduit in telescopic engagement with said second conduit and having its downstream end flared outwardly to provide a spherical socket portion in engagement with said second ball segment and also a second cylindrical anchoring portion projecting from the outer face of said socket portion intermediate its ends; a pair of oppositely disposed bellows-supporting rings, each ring being composed of a single piece of sheet metal having a cylindrical portion secured to the periphery of one of said anchoring portions, and a convex bead portion having a diameter substantially less than the diameter of said cylindrical portion; a detachable, axially flexible metallic bellows composed of a single piece of sheet metal and having a diameter substantially equal to the major diameter of said spherical socket segments, said bellows having a plurality of convolutions, each end convolution having an integral extension capable of transmitting compression and having an annular concave terminal portion the diameter of which is substantially less than the outside diameter of said bellows and which is adapted to seat against said convex bead portion, the concave face of said terminal portion engaging substantially one-half of the convex face of the bead portion; and a pair of detachable clamps embracing the annular terminal portions of said bellows and securing the ends of said bellows to said bellows-supporting rings; said bellows and supporting rings forming a sealed chamber to receive any exhaust gas leaking through the telescopic joint between said second and fourth conduits and the axial expansion of said bellows due to any such leakage causing an increase in pressure of said socket portions against said ball segments.

References Cited in the file of this patent

UNITED STATES PATENTS

| | | |
|---|---|---|
| 289,265 | Hurly | Nov. 27, 1883 |
| 1,782,484 | Spencer et al. | Nov. 25, 1930 |
| 2,242,604 | Wells | May 20, 1941 |
| 2,289,596 | Seamons et al. | July 14, 1942 |
| 2,502,753 | Rohr | Apr. 4, 1950 |
| 2,616,728 | Pitt | Nov. 4, 1952 |

FOREIGN PATENTS

| | | |
|---|---|---|
| 627,120 | Great Britain | July 28, 1949 |